(12) United States Patent
Jeong

(10) Patent No.: US 12,290,834 B2
(45) Date of Patent: May 6, 2025

(54) SLOT DIE AND METHOD FOR PRODUCING A COMPONENT

(71) Applicant: Bayerische Motoren Werke Aktiengesellschaft, Munich (DE)

(72) Inventor: Dongho Jeong, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/248,599

(22) PCT Filed: Oct. 1, 2021

(86) PCT No.: PCT/EP2021/077075
§ 371 (c)(1),
(2) Date: Apr. 11, 2023

(87) PCT Pub. No.: WO2022/084001
PCT Pub. Date: Apr. 28, 2022

(65) Prior Publication Data
US 2023/0405631 A1   Dec. 21, 2023

(30) Foreign Application Priority Data
Oct. 20, 2020   (DE) .................... 10 2020 127 571.4

(51) Int. Cl.
*B05C 5/02*   (2006.01)
*H01M 4/04*   (2006.01)

(52) U.S. Cl.
CPC ......... *B05C 5/0262* (2013.01); *H01M 4/0404* (2013.01)

(58) Field of Classification Search
CPC ... B05C 5/0254; B05C 5/0262; H01M 4/0404
See application file for complete search history.

(56) References Cited

U.S. PATENT DOCUMENTS

| | | | |
|---|---|---|---|
| 3,003,245 A | 10/1961 | Nunez, Jr. | |
| 4,051,807 A | 10/1977 | Graf et al. | |
| 5,643,363 A | 7/1997 | Hosogaya et al. | |
| 2017/0036243 A1* | 2/2017 | Volpato | B29C 44/461 |
| 2019/0141838 A1 | 5/2019 | Kim et al. | |

FOREIGN PATENT DOCUMENTS

| | | | |
|---|---|---|---|
| CN | 101538730 A | | 9/2009 |
| CN | 108604668 | * | 9/2018 |
| DE | 37 41 680 A1 | | 6/1989 |
| DE | 695 19 695 T2 | | 5/2001 |
| DE | 102 31 949 A1 | | 2/2004 |

(Continued)

OTHER PUBLICATIONS

PCT/EP2021/077075, International Search Report dated Jan. 5, 2022 (Two (2) pages).

(Continued)

*Primary Examiner* — Tabassom Tadayyon Eslami
(74) *Attorney, Agent, or Firm* — Crowell & Moring LLP

(57) ABSTRACT

A slot die has a die gap which is formed by a first die surface and a second die surface where the second die surface opposes the first die surface. The die gap extends in a width direction and has a height. At least the first die surface has variable degrees of roughness in the width direction.

8 Claims, 1 Drawing Sheet

(56) References Cited

FOREIGN PATENT DOCUMENTS

| | | |
|---|---|---|
| DE | 10 2008 041 423 B4 | 2/2010 |
| DE | 10 2012 106 509 A1 | 1/2014 |
| DE | 10 2013 221 162 A1 | 4/2015 |
| EP | 3 439 079 A1 | 2/2019 |
| EP | 3 643 411 A1 | 4/2020 |
| JP | 11-90295 A | 4/1999 |
| JP | 2008-168165 A | 7/2008 |
| JP | 2019-108249 A | 7/2019 |
| WO | WO 2020/139664 A1 | 7/2020 |

OTHER PUBLICATIONS

German Search Report issued in German application No. 10 2020 127 571.4 dated Jun. 18, 2021, with Statement of Relevancy (Ten (10) pages).

English translation of Chinese-language Office Action issued in Chinese Application No. 202180054987.3 dated Jan. 24, 2025 (7 pages).

\* cited by examiner

SLOT DIE AND METHOD FOR PRODUCING A COMPONENT

BACKGROUND AND SUMMARY OF THE INVENTION

The present invention relates to a slot die and a method for producing a component, such as an electrode of, or for, an energy storage cell, for example a lithium-ion cell.

Slot dies of the type under discussion are used in slot-die coating. In this coating technique, thin liquid layers are applied to web-shaped substrates or even piece goods. The accuracy of the layer to be applied or the uniformity thereof represents a significant challenge. Electrodes of lithium-ion cells, for example, are produced with this technique, wherein very thin metal foils are coated with the greatest level of accuracy. The quality of the coating significantly determines the capacity and operating behavior of the battery cell over the service life thereof. In order to influence or to control the application of the coating, it is known from the prior art to vary the die gap. This can be carried out, for example, by the use of inserts (shims) as disclosed in EP 3 643 411 A1. WO 2020/139664 proposes to configure the die lip to be movable, so as to vary the die gap. In order to generate a uniform mass flow rate, in particular across the entire width of the slot die, DE 10 2008 041 423 B4 proposes to provide a coating tool with a distribution space, wherein a plurality of distribution channels with an increasing cross-sectional surface in the direction of flow is provided in the distribution space, wherein each of the distribution channels is connected to a corresponding supply channel provided in the channel. The known approaches, however, are sometimes very complex structurally and difficult to implement, in particular in the case of thin die gaps.

Thus it is an object of the present invention to specify a slot die and a method for producing a component, wherein optimal coating accuracies and qualities can be achieved with the greatest level of process reliability.

According to the invention, a slot die comprises a die gap which is formed by a first die surface and a second opposing die surface, wherein the die gap extends in a width direction and has a height, wherein at least the first die surface has variable degrees of roughness in the width direction. The flow rate through the die gap can be set very accurately via the roughness of the die surface, in the present case at least the first die surface, wherein the die surfaces are also called die lips. The application of the coating can be controlled in a very targeted and accurate manner by forming variable degrees of roughness in the width direction of the die gap, i.e., in particular transversely or substantially transversely to a direction of flow of the coating material. In particular, the layer thickness can be influenced very easily thereby so that it is possible, for example, to set exactly the same coating thickness in the width direction or a coating with a changing thickness/height, if desired.

According to one embodiment, the first die surface is formed in the width direction by a plurality of portions which have variable degrees of roughness, and wherein at least according to one embodiment the portions are configured to be of variable size or width in the width direction. The application of the coating can be advantageously controlled locally and accurately via the width of the portions. While the degree of roughness is expediently varied in the width direction, the degree of roughness in the longitudinal direction or direction of flow is preferably uniform in each case. According to a preferred embodiment, each portion has a uniform or substantially uniform degree of roughness. The variable degree of roughness in the width direction is set by the portions having a variable degree of roughness relative to one another, for example a portion having a greater degree of roughness than the other portion or the other portions.

Alternatively, it can be provided that the first die surface additionally has a changing degree of roughness transversely to the width direction, i.e., in the direction of flow. According to this embodiment, the portions have a correspondingly configured roughness profile in the direction of flow, for example a degree of roughness which reduces in the direction of flow, and alternatively also vice versa. Thus the flow rate can be advantageously influenced.

According to a preferred embodiment, for example, three portions are provided, wherein according to one embodiment a central portion has a lower degree of roughness than the outer portions. It has been shown that a very uniform application can be achieved by such a configuration over the width.

According to one embodiment, for example, the central portion has an Rz value of 3 to 8, for example 5, while the two outer portions or the edge portions have an Rz-value of 12 to 20, for example 16. The aforementioned roughness values are merely to be understood by way of example, since the actual configuration is substantially dependent on further parameters, such as for example the type of coating material or the height of the die gap, etc.

According to one embodiment, three portions are provided, the three portions having in each case the same width or length in the width direction.

According to one embodiment, the slot die has an insert which is arranged so as to be interchangeable, wherein the insert forms or comprises the portions. Expediently, the slot die can be adapted rapidly and in an uncomplicated manner by replacing the insert. Expediently, the slot die has a plurality of variably configured inserts which have a variable degree of roughness in the width direction. Thus an application of the coating, which is reliable in terms of process and which is rapid, can be set via the arrangement of a corresponding insert.

According to one embodiment, the portions are segments or are configured as segments which are arranged so as to be interchangeable in the slot die or the insert. According to one embodiment, each portion is configured individually as a part or element which can be interchangeably arranged. In this manner, the die gap can be adapted individually and locally in the width direction via the arrangement of the corresponding portion. Correspondingly, according to one embodiment the slot die comprises a plurality of such segments which can be arranged as required.

According to one embodiment, the segments can be arranged or positioned in a variable manner in the width direction. In particular, according to one embodiment the segments can be arranged in a variable manner in the insert or in the slot die. This means that the segments or the slot die or the insert are expediently shaped and configured such that no specific space is assigned to a segment. This is advantageous in terms of flexibility since, for example, a portion or segment having a low roughness value can be arranged both in the center and at the edge. According to one embodiment, the segments or the insert or the inserts are designed to be positively and/or non-positively arranged/fastened. Preferably, for example, fastening elements such as screws are used. Alternatively or additionally, plug connections and the like can also be advantageously used.

According to one embodiment, the die gap is configured with a variable height in the width direction, i.e., when viewed transversely to the direction of flow. It has been shown, for example, that it can be expedient to configure the die gap to be larger/higher in the central region relative to the flow cross section.

According to one embodiment, the die gap has a stepped height profile in cross section, for example by forming portions or segments which have a variable thickness or height.

According to one embodiment, the die gap has a uniform height profile in cross section. This means that a uniform stepless transition is provided between the portions/segments.

The portions or segments in profile, i.e., when viewed transversely to the direction of flow, can be configured to be straight/flat or even not straight, for example following a curved or wave-shaped profile.

According to a preferred embodiment, the height and/or the shape of the die gap is set via the configuration of the portions. In other words, the portions or segments expediently have a variable thickness, whereby in the installed state of the segments/portions a variable height is produced for the die gap.

According to one embodiment, the slot die comprises one or more spacer elements. The height of the die gap can be set in a flexible manner via these spacer elements, which are positioned below the portions.

According to one embodiment, the die gap has both a greater height and a lower degree of roughness in the central region than in the edge regions. According to one embodiment, this is set, for example, via three correspondingly configured portions. Preferably, the central region of the die gap which has the lower degree of roughness is wider than the adjoining side regions, for example 1.5-times, 2-times or even 3-times as wide.

According to one embodiment, the second die surface has variable degrees of roughness in the width direction. According to one embodiment, all of the advantages and features which have been mentioned in the present case in connection with the first die surface apply to the second die surface. The die gap is substantially formed by two die lips or die surfaces. According to one embodiment, only one die surface has variable degrees of roughness, such as for example the first die surface. Alternatively, both die surfaces have variable degrees of roughness, in particular the first die surface and the second die surface. In particular, both die surfaces can be configured individually via the use of inserts, portions, segments, etc.

The slot die comprises a distribution channel which extends in the width direction or along the die gap and thus transversely to the direction of flow. The die gap is supplied via the distribution channel. The distribution channel in turn is supplied via at least one supply channel. According to one embodiment, the slot die comprises a supply channel which preferably leads centrally into the distribution channel. According to an alternative embodiment, the slot die comprises a plurality of supply channels which lead into the distribution channel in a manner in which they are distributed spaced apart from one another. Thus a more uniform distribution of the coating material can be expediently achieved into the distribution channel.

The invention further relates to a method for producing a component, wherein a fluid is applied onto a substrate material by means of a slot die according to the invention.

According to a preferred embodiment, a collector foil of an energy storage cell is coated as the substrate material. It has been shown that even the coating materials which are used in the field of the production of electrodes for energy storage cells, such as for example lithium-ion or lithium sulfur cells, react well to the setting of variable degrees of roughness in the die gap. The coating materials used in the field of producing electrodes are minimal, or the Reynolds numbers obtained in the tools are generally low, and react well to an adaptation of a surface of the die gap Further advantages and features are found in the following description of embodiments of slot dies with reference to the accompanying figures.

DETAILED DESCRIPTION OF THE DRAWINGS

Figure 1:
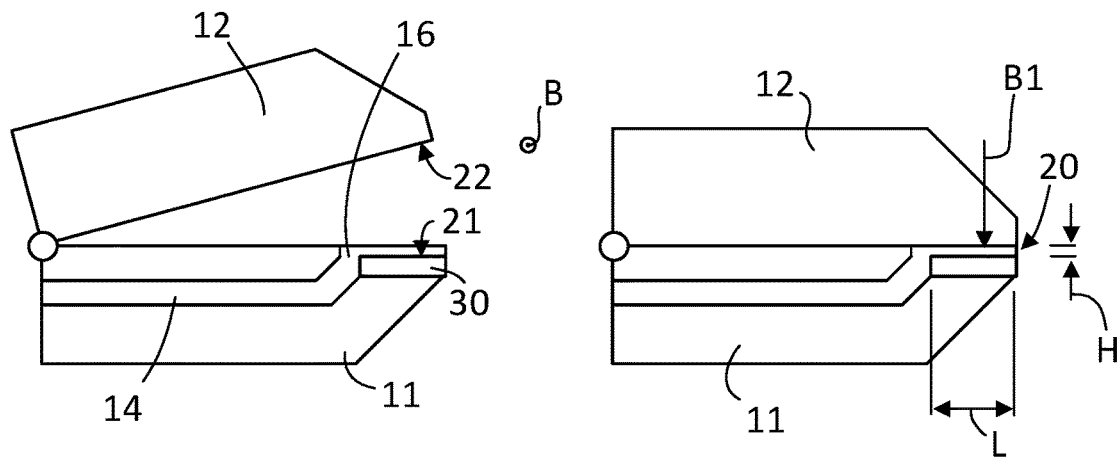
FIG. 1 shows two schematic sectional views of an embodiment of a slot die.

FIG. 1 shows in the left-hand portion of the image a sectional view of a slot die comprising a first die part 11 and a second die part 12. The slot die is shown in an open position in the left-hand portion of the image. The first die part 11 comprises a supply channel 14 which leads into a distribution channel 16. The slot die is shown in the present case in section transversely to a width direction B. A second die surface 22 and a first die surface 21 can be identified, wherein these die surfaces are configured as a portion which is preferably configured to be interchangeable. The first die surface 21 and the second die surface 22 form a die gap 20 in the closed state of the slot die, see the right-hand portion of the image. This die gap has a height H and a length L which extends in a direction of flow of a coating material (not shown here). A viewing direction of the first die surface 21 is outlined by the reference sign B1. The view is shown schematically in FIG. 2.

Figure 2:
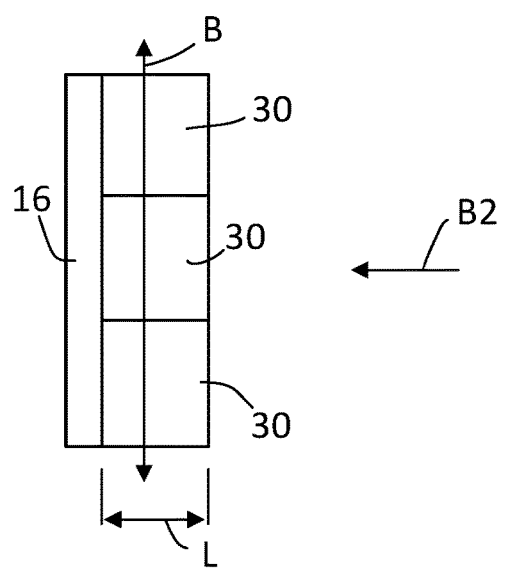
FIG. 2 shows a schematic detailed view as outlined in FIG. 1.

FIG. 2 shows schematically a detail as outlined in FIG. 1 by the reference sign B1. The distribution channel 16 and three portions 30 can be identified. According to one embodiment, for example, the central portion 30 has a different degree of roughness from the outer two portions 30. Thus a variable degree of roughness can be set over the width direction B of the slot die. According to one embodiment, each of the portions 30 is configured individually as a segment and to be interchangeable. Alternatively, the portions 30 can be part of an insert which can be replaced as a whole. The portions 30 can differ, for example, in their thickness or height, whereby a height H of the die gap can be set, see the right-hand portion of the image of FIG. 1.

Figure 3:
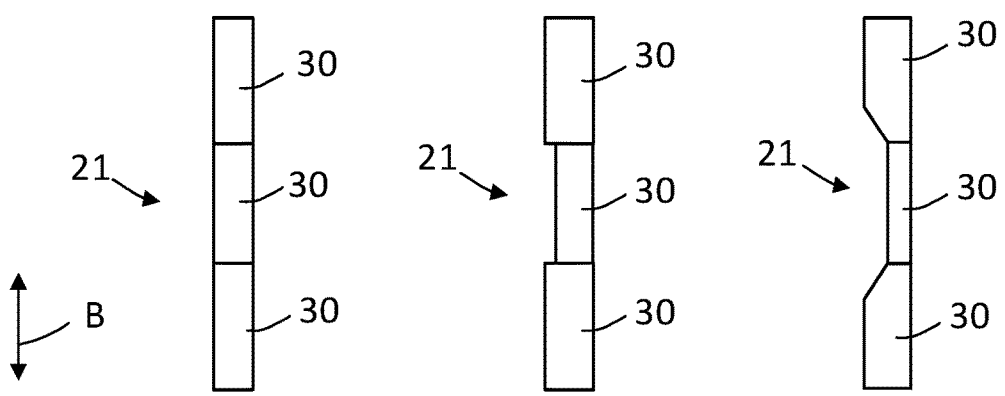
FIG. 3 shows three further schematic views as outlined in FIG. 2.

FIG. 3 shows schematically various embodiments of a first die surface 21. For orientation, reference is made to the arrow in FIG. 2, see the reference sign B2, which specifies the underlying viewing direction. The first die surface 21 in each case is formed by three portions 30. The direction of flow runs, so to speak, vertically out of the drawing plane, see the viewing direction B2, as outlined in FIG. 2. In the embodiment according to the left-hand portion of the image, the three portions 30 are configured to be of equal height. In the central portion of the image, the central portion 30 is configured to be lower, whereby in the width direction B a die gap of variable height, in particular a stepped hollow profile, is produced. In the present case, the outer portions 30 are configured to be thicker. Alternatively, it might also be possible to use spacer elements. In this case, portions 30 which are of the same configuration could be used, wherein the desired height is set via the number and the height of the installed spacer elements. A further embodiment is shown in the right-hand portion of the image, wherein the die gap is also configured here with a variable height in the width direction B. However, a transition is provided between the outer portions 30 and the inner portion 30. According to a further embodiment, not shown here, a uniform transition can also be provided between the portions in order to provide an entirely stepless height profile. To this end, the portions are preferably not configured to be flat or straight but follow a contour.

LIST OF REFERENCE CHARACTERS

11 First die part
12 Second die part
14 Supply channel
16 Distribution channel
20 Die gap
21 First die surface
22 Second die surface
30 Portion
B Width direction
L Length
H Height
B1,B2 Viewing directions

The invention claimed is:

1. A slot die, comprising:
a die gap which is formed by a first die surface and a second die surface, wherein the second die surface opposes the first die surface, wherein the die gap extends in a width direction and has a height, and wherein the first die surface has variable degrees of roughness in the width direction; wherein the first die surface is formed in the width direction by a plurality of portions which have variable degrees of roughness, wherein the plurality of portions are configured to be of variable size or width in the width direction, wherein the plurality of portions are segments which are arranged so as to be interchangeable in the slot die or an insert, and wherein the segments are arrangeable or positionable in a variable manner in the width direction.

2. The slot die according to claim 1, wherein the plurality of portions includes at least three portions and wherein a central portion of the at least three portions has a lower degree of roughness than outer portions of the at least three portions.

3. The slot die according to claim 1, wherein the die gap has a variable height in the width direction.

4. The slot die according to claim 1, wherein the height of the die gap is set via a configuration of the plurality of portions.

5. The slot die as claimed in claim 1, wherein the height of the die gap is greater in a central region of the die gap than at edges of the die gap.

6. The slot die according to claim 1, wherein the second die surface has variable degrees of roughness in the width direction.

7. A method for producing a component, comprising the step of:
applying a fluid onto a substrate material by the slot die according to claim 1.

8. The method according to claim 7, wherein the substrate material is a collector foil of an energy storage cell.

* * * * *